US011117344B2

(12) United States Patent
Martino-Gonzalez et al.

(10) Patent No.: US 11,117,344 B2
(45) Date of Patent: Sep. 14, 2021

(54) DEFORMABLE AUXETIC STRUCTURE AND MANUFACTURING PROCESS

(71) Applicant: Airbus Operations S.L., Getafe (ES)

(72) Inventors: Esteban Martino-Gonzalez, Getafe (ES); Iker Velez De Mendizabal Alonso, Getafe (ES); David Apellaniz De La Fuente, Getafe (ES)

(73) Assignee: AIRBUS DEFENCE AND SPACE, S.A.U., Getafe (ES)

( * ) Notice: Subject to any disclaimer, the term of this patent is extended or adjusted under 35 U.S.C. 154(b) by 34 days.

(21) Appl. No.: 16/205,973

(22) Filed: Nov. 30, 2018

(65) Prior Publication Data

US 2019/0168480 A1 Jun. 6, 2019

(30) Foreign Application Priority Data

Dec. 1, 2017 (EP) .................... 17382827

(51) Int. Cl.
| | |
|---|---|
| B32B 3/12 | (2006.01) |
| B29D 99/00 | (2010.01) |
| B64C 1/12 | (2006.01) |
| B64C 3/26 | (2006.01) |
| B29C 44/34 | (2006.01) |
| B64C 1/00 | (2006.01) |

(52) U.S. Cl.
CPC ............ B32B 3/12 (2013.01); B29D 99/0021 (2013.01); B29D 99/0089 (2013.01); B64C 1/12 (2013.01); B64C 3/26 (2013.01); B29C 44/357 (2013.01); B29K 2995/0089 (2013.01); B29K 2995/0091 (2013.01); B32B 2605/18 (2013.01); B64C 2001/0072 (2013.01)

(58) Field of Classification Search
CPC ......... B32B 3/12; B32B 2605/18; B64C 3/26; B64C 2001/0072; B29C 44/357; C09K 11/612; B29K 2995/0089; B29K 2995/0091; B29D 99/0021; B29D 99/0089
See application file for complete search history.

(56) References Cited

U.S. PATENT DOCUMENTS

| | | | | |
|---|---|---|---|---|
| 2007/0031667 | A1* | 2/2007 | Hook | D02G 3/24 428/373 |
| 2011/0250445 | A1* | 10/2011 | Alderson | C09J 7/20 428/343 |
| 2013/0322955 | A1* | 12/2013 | Ma | E04B 1/1903 403/53 |

OTHER PUBLICATIONS

Hengsbach et al. (Smart Mater. Struct. 23(2014) 085033). (Year: 2014).*
Imbalzano et al. (J. Sandwich Struc and Mater 19(3) pp. 291-317 (2017) (Year: 2015).*
Alvarez Elipe et al. (Smart Mater. Struct (21) 2012) (Year: 2012).*
(Continued)

*Primary Examiner* — Alicia J Sawdon
(74) *Attorney, Agent, or Firm* — Greer, Burns & Crain, Ltd.

(57) ABSTRACT

A deformable auxetic structure for absorbing energy of an impact that comprises a plurality of interconnected adjoining tridimensional auxetic cells where each tridimensional auxetic cell comprises at least one surface element and a plurality of legs extending from the surface, the plurality of legs and the surface element being configured such that the sectional cut of the structure in at least two planes perpendicular to the surface element follows an auxetic pattern.

15 Claims, 10 Drawing Sheets

(56) References Cited

OTHER PUBLICATIONS

European Search Report; priority document.
Gabriele Imbalzano et al., "Three-Dimensional Modelling of Auxetic Sandwich Panels for Localized Impact Resistance," Journal of Sandwich Structures and Materials, No.
Andres Diaz Lantada et al., "Lithography-Based Ceramic Manufacture (LCM) of Auxetic Structures: Present Capabilities and Challenges," IOP Publishing Ltd., Apr. 8, 2016.
Yanping Liu et al., "A Review on Auxetic Structures and Polymeric Materials," Institute of Textiles and Clothing, The Hong Kong Polytechnic University, Scientific Research and Essays vol. 5 (10), pp. 1052-1063, May 18, 2010.

\* cited by examiner

DEFORMABLE AUXETIC STRUCTURE AND MANUFACTURING PROCESS

CROSS-REFERENCES TO RELATED APPLICATIONS

This application claims the benefit of the European patent application No. 17382827.8 filed on Dec. 1, 2017, the entire disclosures of which are incorporated herein by way of reference.

FIELD OF THE INVENTION

The invention relates to auxetic structures, in particular, to three-dimensional auxetic structures and applications thereof. Specifically it refers to a cellular material used in aircraft construction, shipbuilding and other branches of industry.

BACKGROUND OF THE INVENTION

Although in terms of blade loss no special protections are applied in current aircraft, some studies have been performed by the National Aeronautics and Space Administration (NASA) and the Federal Aviation Administration (FAA) in order to assess the carbon fiber composite thickness required by the fuselage in the potential impact area to resist such an event. Some of the results obtained indicate that significant thickness and penalty weight of carbon fiber fuselage skin was required to stop a blade loss.

In terms of protection for Uncontained Engine Rotor Failure (UERF) events, the design precautions to be taken to minimize the hazards to an engine or auxiliary power unit are dry bays or shielding for fuel tanks located in impact areas. Aluminum or Titanium are the shielding alternatives typically used for these events.

Conventional materials found in nature have positive Poisson ratio, they get thinner when stretched and widened when compressed, following the Poisson ratio equation:

$$v_{yx} = -\frac{\text{transverse strain}}{\text{axial strain}} = -\frac{\varepsilon_x}{\varepsilon_y}$$

Accordingly, Poisson's ratio is defined as the negative of the transverse strain divided by the longitudinal strain.

There are materials or structure geometries configurations that exhibit opposite behavior, that are called auxetic, having a negative Poisson ratio and when stretched, they become wider on the transversal directions to the applied force, and thinner when compressed. Therefore, applying a unidirectional tensile force to auxetic material results in an increase in size in the transverse dimension. The behavior of the configuration under impact, which is equivalent to a compression, is that it concentrates material around the impact area due to the negative Poisson nature of these configurations.

There are known, two dimensional auxetic structures having a cell arrangement comprising a plurality of adjoining cells being shaped as inverted hexagons, that present an auxetic behavior in the two in-plane directions of the cell's geometry.

There are known, auxetic structures having cells being shaped as inverted hexagons joined alternatively together forming a two dimensional (2D) cellular grid, that are extruded in one direction to form a panel in which the height of the two dimensional (2D) grid becomes the thickness and the width of the grid and the extrusions dimensions represent the planar dimensions of the cellular panel. These panels have auxetic behavior in one direction, as they are able to condensate on the width direction of the original grid, when a compression load is applied perpendicular to the thickness of the panel.

Cellular panels are used in a variety of engineering applications and conventional honeycomb hollow cell sandwich structures have become widely used for their strength and lightness. The geometries of conventional cellular structures have been used as cores in sandwich panels within, for example, the aerospace and marine industry.

Composite armors are also known, these armors are typically composed of layers of different materials, such as metals, fabrics and ceramics. A classical known composition mixes ceramic layer tiles and ballistic fabric layer reinforced plastic. Although they are lighter than their equivalent full metallic armors, they still put a significant weight penalty in the structures they are integrated in. This weight penalty is especially critical in aircraft, where range, speed and/or lift performances can be penalized.

SUMMARY OF THE INVENTION

An aim of this invention is to provide a lightweight protection against high energy impacts in aircraft airframes and systems, by means of, for instance, a single integrated manufactured sandwich panel, taking advantage of the bidimensional auxetic behavior in the two directions forming the surface of the panel, when an impact load has a perpendicular component with respect to the panel, so that it allows even lighter configurations, combined with high performing ballistic materials.

The application of such protection would be especially advantageous in highly integrated rear end engine driven aircraft configurations, such as Open Rotor or Boundary Layer Ingestion architectures, where protection provisions (shieldings) are required due to safety concerns against Propeller Blade Release (PBR) and Engine Debris (Uncontained Engine Rotor Failure small fragment and third disc) high energy impacts on the fuselage, thus resulting in sizing drivers of the structure. This would result in high weight penalties if conventional state of the art protection solutions were applied.

A deformable structure object of the invention is intended to absorb energy of an impact and, according to the above explanation, is of the kind that comprises a tridimensional auxetic structure formed by a plurality of interconnected adjoining tridimensional auxetic cells.

The structure comprises an auxetic arrangement formed by a plurality of interconnected adjoining tridimensional auxetic cells, each tridimensional auxetic cell comprising at least a surface element and a plurality of legs extending from the surface element, the plurality of legs and the surface element being configured such that the section cut or projection of the structure, in at least two planes perpendicular to the surface element, follows an auxetic pattern.

The surface element may have a planar surface, a curved surface or may be formed by different planar surfaces.

The resulting structure is able to achieve auxetic behavior on each one of these at least two planes and, as a consequence, is able to achieve auxetic behavior in more than one dimension perpendicular to the impact main direction, with the advantage that the condensate effect is increased and the shielding performance is significantly improved with reduced weight.

In an embodiment, each tridimensional auxetic cell comprises a second surface element having an offset with the first surface element in the longitudinal direction of the cell, extending the plurality of legs between both surfaces. Therefore, each auxetic cell comprises a first and a second surface element separated by a distance in the main direction of the impact and a plurality of legs extending between the first and the second surface elements.

In an embodiment, the cells are a tridimensional re-entrant hexagonal auxetic cell, and thus the legs have kinks in the surface element of the adjacent auxetic cells that are located in an intermediate distance between the two surface elements of every cell according to a re-entrant hexagonal auxetic pattern.

It is also an object of the invention to provide a sandwich panel comprising an inner core according to the previously described structure and two parallel external layers covering the inner core.

The invention therefore may comprise an auxetic geometry based sandwich structure that could be made of aramid, or other good performant ballistic fibers (Polypropylene, PBO, UHMWPE, . . . ), that could even be combined with a ceramic material layer in the auxetic structure surface elements facing the potential threat. Therefore, it is also an object of the present invention to provide an auxetic based configuration sandwich concept intended to be used as a lightweight ballistic shield for protecting aircraft systems and airframe from potential hazardous events, such as Propeller Blade Release (PBR) or Uncontained Engine Rotor Failure (UERF).

It is also an object of the present invention to provide a shock absorber that comprises an inner core according to the above mentioned deformable auxetic structure and an external layer surrounding the inner core.

The manufacturing of a shielding concept according to the invention can be easily achieved by means of conventional or three dimensional (3D) printing techniques combining ceramic and carbon or/and ballistic fibers fabric materials.

As an alternative, the claimed structure can also be manufactured from a plurality of tapes of the adequate material comprising the following steps:
providing a first tape of material,
folding the first tape of material following a bidimensional auxetic pattern of adjacent cells having a surface element and two legs extending from the surface element,
providing a second tape of material,
joining the second tape of material to one of the surface elements of the bidimensional auxetic pattern of the first tape forming an angle with the longitudinal direction of the first tape,
folding the second tape of material following a bidimensional auxetic pattern of adjacent cells having a surface element and two legs extending from the surface element, the first tape and the second tape of material being configured such that the section cut or projection of the structure in at least two planes perpendiculars to the surface element follows a bidimensional auxetic pattern,
providing additional tapes of material and joining them to every surface element of the bidimensional auxetic pattern of the first tape of material and repeating the previous step.

The folding and joining steps of the second tape can be made in any order, i.e., firstly folded and then joined to the first tape or firstly joined and afterwards folded.

The invention is therefore related to the configuration and manufacturing process of an innovative lightweight shield against high energy impacts, as PBR or UERF events, with special application in rear end mounted engines aircraft architectures using OR or BLI engines, but also translatable to conventional architecture aircraft where such shielding requirements may be fulfilled.

In terms of performance, when an impact occurs, due to the auxetic structure configuration behavior, the material tends to concentrate in the areas close to the impact point. When this happens with the previously described defined configuration, both surface element and legs of the auxetic cells tend to deform inwardly of the cell in more than one direction perpendicular to the main impact direction at the impact area, describing the condensation of structure on the impact zone in more than one direction and, as a result, providing required ballistic improved properties in the zone where the impact is taking place.

The impact performance of such concept has been improved as the densification behavior of the auxetic core is achieved in more than one direction perpendicular to the main impact direction, thus configuring a multi-direction auxetic core structure. This allows even lighter impact protection instead of from only one direction as in a conventional auxetic configuration.

BRIEF DESCRIPTION OF THE DRAWINGS

To complete the description and in order to provide for a better understanding of the invention, a set of drawings is provided. The drawings form an integral part of the description and illustrate preferred embodiments of the invention. The drawings comprise the following figures.

FIGS. 7A and 7B show the structure before and after condensation.

DETAILED DESCRIPTION OF THE PREFERRED EMBODIMENTS

Figure 1A:
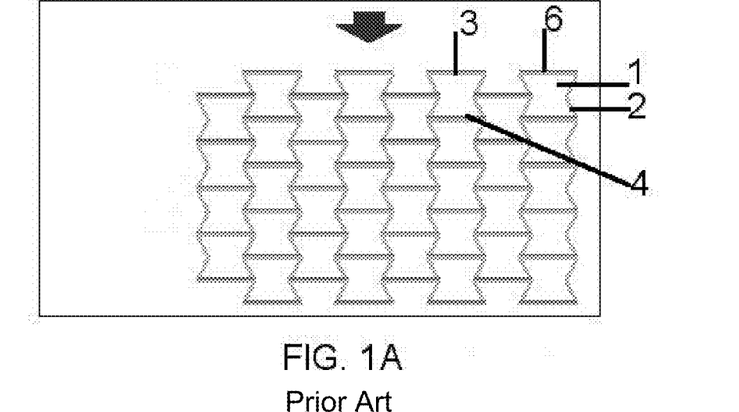
FIG. 1A shows a cross sectional view of a known bidirectional auxetic structure comprising re-entrant hexagonal cells.
Figure 1B:
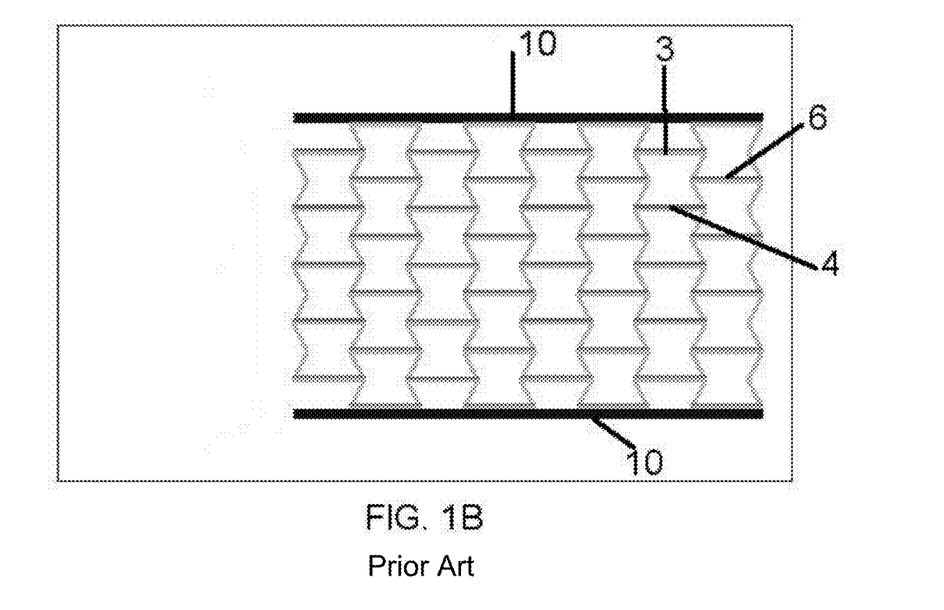
FIG. 1B shows a cross sectional view of a known sandwich panel having a deformable structure according to FIG. 1A.

FIGS. 1A and 1B show a sectional view of a known auxetic structure in which an assembly of auxetic cells (1) are extruded conventionally in a direction perpendicular to the section view to generate a three dimensional structure. In this structure, each auxetic cell (1) is angled in the form of a polygon having a plurality of edges and vertices, more specifically, it corresponds with a re-entrant hexagonal auxetic cell (1). Each auxetic cell (1) defines an internal cavity. This structure exhibits auxetic behavior only in one direction, when it experiences compression deformation, for example, in the impact direction showed in FIG. 1, the structure is able to condensate only in the direction perpendicular both to the impact direction and to the direction of extrusion.

Preferably, the walls (2) of the auxetic cells (1) are made of high strength material as aramid or ultra-high molecular weight polyethylene fibers and the walls (2) facing towards the threat are covered by a layer (6) of a hard material, such as ceramic.

In order to reduce their weight, the cavities of the cells (1) can be filled directly with air or by a light and deformable material, such as foam.

Taking advantage of the behavior described for the claimed structure, this configuration wouldn't require as much ceramic material as in a conventional configuration, as the ceramic layers (6) would concentrate themselves around the threat impact area. The same happens with the aramid layers. This results in a lighter configuration than a conventional ceramic/aramid one, where constant thickness ceramic and aramid layers with equivalent density as the concentrated one around the impact area, are required on the full area requiring protection, in order to achieve the same shielding performance. As a result, these conventional solutions achieve a higher overall density and weight penalty.

Figure 2A:
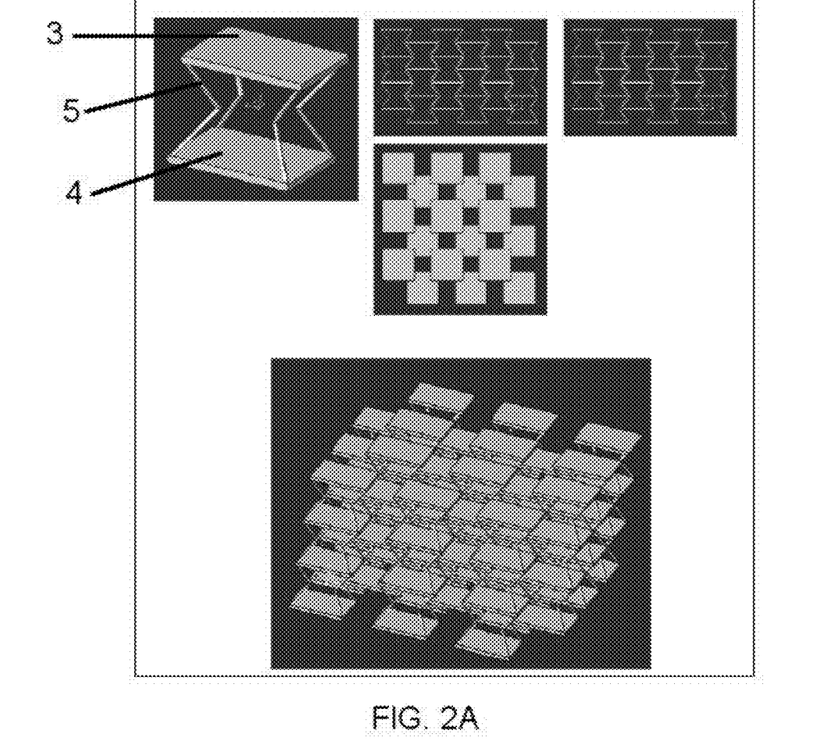
FIG. 2A shows an embodiment of a tridimensional cell geometry with square top and bottom parallel surface elements and having a projection or section cut in two planes perpendicular to the surface elements having a bidirectional re-entrant hexagonal pattern.
Figure 2B:
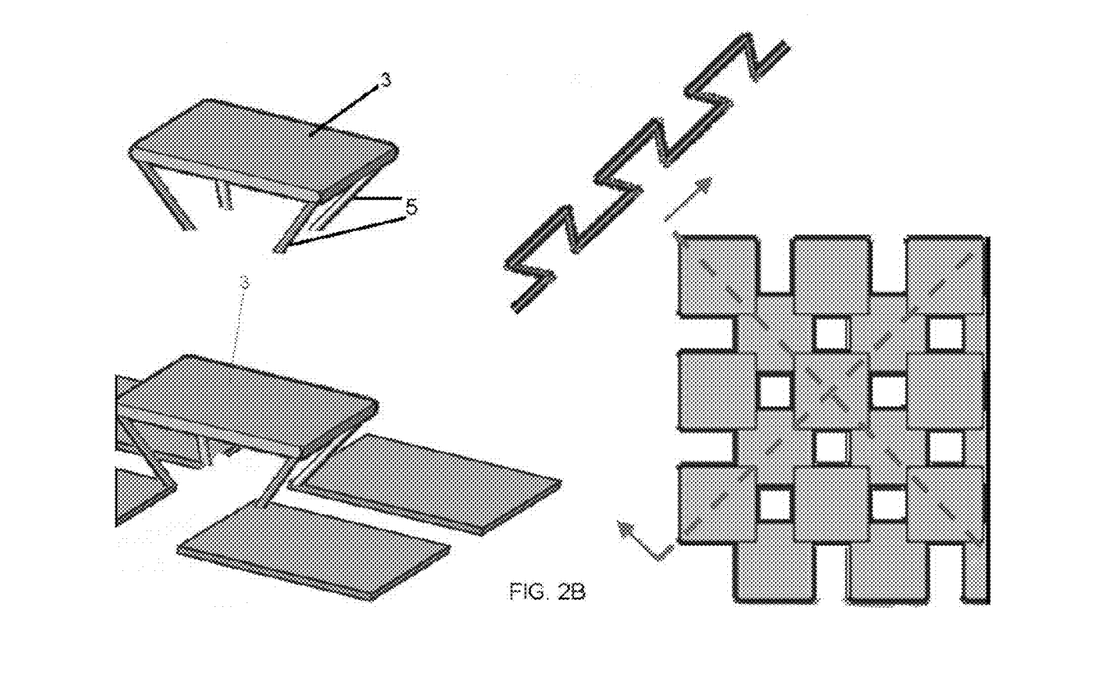
FIG. 2B shows another embodiment of a tridimensional cell geometry with a square top surface element and having a projection in two planes perpendicular to the surface element having a bidirectional re-entrant hexagonal pattern.

The auxetic cells (1) shown in FIGS. 2A and 2B comprise a first (3) and, optionally, a second (4) parallel surface element and a plurality of legs (5) extending from the first (3) surface element to the second (4) surface element, if any. The plurality of legs (5) and the surface elements (3, 4) are configured such that the projection or section cut of the structure in two planes perpendicular to the first and the second surface elements (3, 4) follows an auxetic pattern.

In order to achieve a bidirectional auxetic behavior, several additional embodiments are depicted, all based in auxetic cell (1) configurations.

Figure 3:
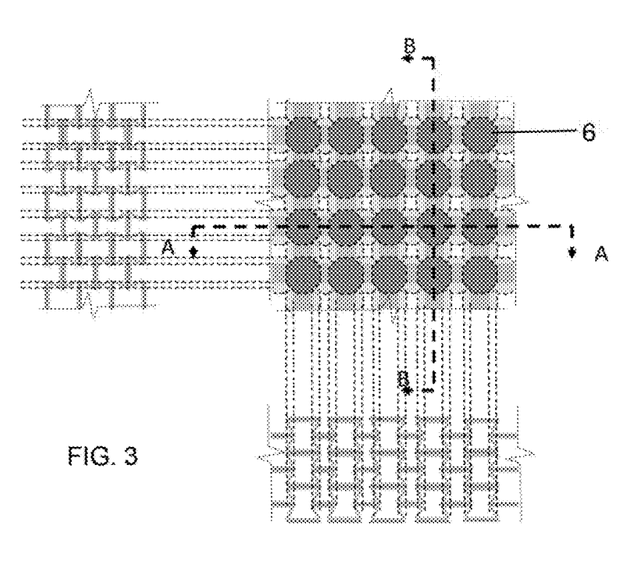
FIG. 3 show a plan view structure and two section views of the same, having a tridimensional cell geometry comprising an octagonal top and bottom additional layers covering the surface elements of the cells.

FIG. 3 shows a plan view structure and two section views of the same, having a tridimensional cell geometry, additionally comprising octagonal top and bottom layers (6) covering the surface elements (3, 4) of the auxetic cells (1).

Figures 4A, 4B, 4C, 4D:
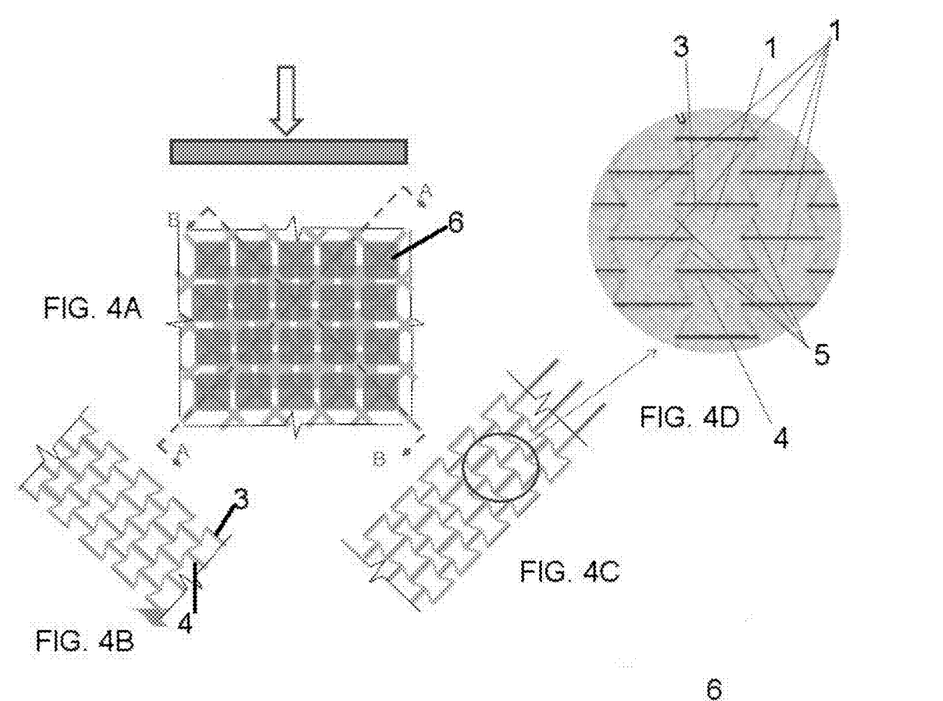
FIGS. 4A to 4D show a tridimensional plan view structure and two section views of the same, having a tridimensional cell geometry having square top and bottom layers covering the surface elements.

FIGS. 4A to 4D show an embodiment of the deformable structure object of the invention where the cell structure is based in re-entrant hexagon tridimensional auxetic cells (1). The first and the second surface elements (3, 4) of the auxetic cell (1) are covered by a layer (6) having a polygon planar shape, distinctively a four sided polygon, i.e., square top and bottom layers (6), separated by a vertical offset distance, as the impact main direction is vertical as shown in FIG. 4A. The legs (5) re-enter the cell (1) extending from at least every vertex of the first and second surface elements (3, 4) to a corresponding vertex of the surface elements (3, 4) of the adjacent auxetic cells (1) that is located in an intermediate distance between the first (3) and the second (4) surface elements of this first auxetic cell (1), in the main direction of the impact. The legs (5) reenter towards the auxetic cell (1) such that they show a re-entrant hexagonal structure on the section view through the two perpendicular planes containing the vertical main impact direction and the diagonal of the surface elements (3, 4), as shown in FIGS. 4C to 4D.

Figure 5A:
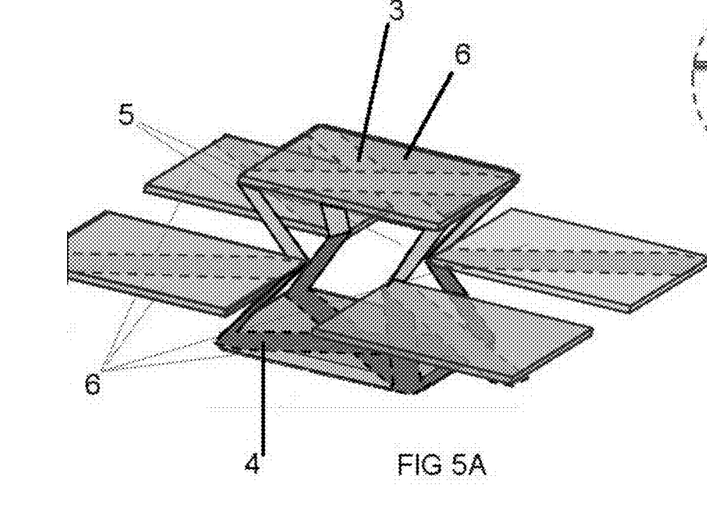
FIGS. 5A and 5B show a tridimensional view of another embodiment of a tridimensional cell geometry having a tridimensional re-entrant auxetic pattern, the figure also including the intermediate surface elements of the adjacent cells.

FIG. 5A shows an isometric view of one tridimensional auxetic cell (1) of another embodiment, the figure also including the layers (6) of the adjacent cells (1).

Figure 5B:
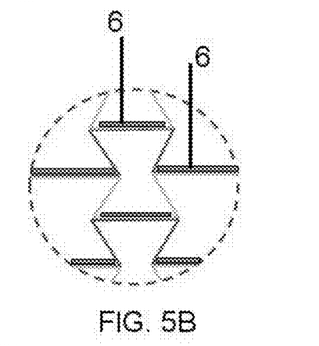

In this embodiment, as can be seen in those two figures, both the legs (5) and the surface elements (3, 4) are formed by a continuous tape (20, 30) of high strength material that is kinked, forming a zig-zag, being the surface elements (3, 4) shaped as a cruciform shape formed by the crossing of two tapes (20, 30) for each auxetic cell (1). The tapes (20, 30) can be made directly of just high strength ballistic material or a combination with hard material on its composition to increase the resulting impact resistance performance.

Additionally, each auxetic cell (1) comprises a layer (6) of material located covering the first and/or the second surface elements (3, 4). In this embodiment, the layers (6) are made of hard material placed on top of the diagonal crossing of the two tapes (20, 30), perpendicular to the impact main direction to increase the impact resistance at the impact point. This embodiment has the advantage that condensates the hard material layer (6) elements in two directions perpendicular to the impact direction to avoid local penetration, and also the continuous tape (20, 30) of high strength material is able to extend in zones out of the impact point to absorb a large amount of energy by large deformation, acting as a deployable net, taking full benefit of its ballistic fabric nature.

Alternatively, in FIGS. 5A and 5B, the layers (6) of the cells (1) are placed on the top of the tapes (20, 30) facing the impact direction, but in order to simplify the manufacturing process, they could be placed also at the bottom of the crossing of the tapes (20, 30) or even in between the two diagonals of the tapes (20, 30).

Figure 6:
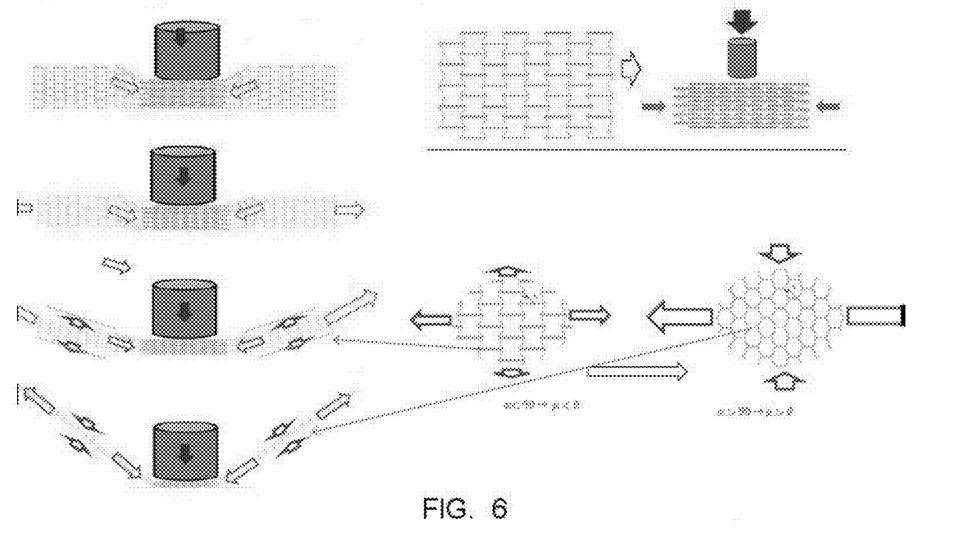
FIG. 6 shows a section view of an embodiment of the structure under an impact and four different deformation stages of the structure.

FIG. 6 shows a section view of the structure under an impact, and four differentiated deformation stages can be observed:

A first stage of densification, in which the material around the impact area densificates due to the auxetic nature, in two different directions.

A second stage of locking, in which the structure cannot densificate nor crush nor unfold anymore at the impact area.

A third stage of global deformation, where the zones of the structure that are out of the impact area extend and the thickness of these areas increases due to auxetic behavior, absorbing a significant amount of energy.

A fourth stage in which the areas out of the impact area are extended further, the structure becoming non auxetic due to the large deformation of the auxetic cells (1), that are not re-entrant any more, and, as a consequence, the thickness is reduced, extending the structure up to a final deployed stage in which the remainder of the structure deforms globally as a net, absorbing the remaining energy of the impact due to its ballistic fabric nature.

Figure 7A:
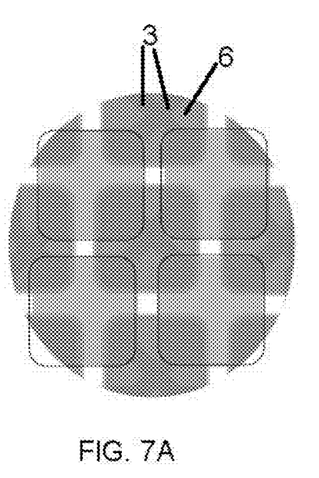
FIGS. 7A and 7B show an embodiment of the cells in which the surface elements have a cruciform shape and additionally comprises a layer covering the surface elements, the layer having a square shape.
Figure 7B:
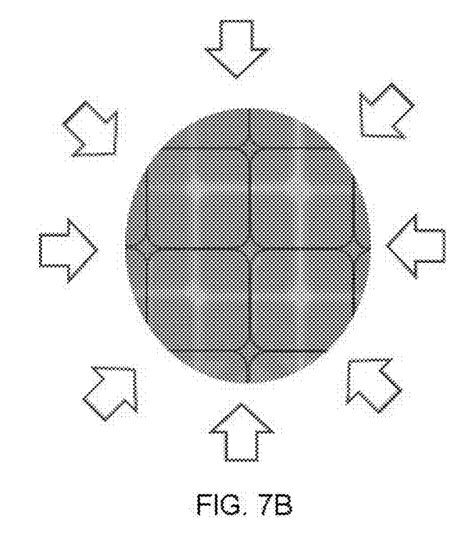

FIG. 7 shows an embodiment of the tapes (20, 30) forming the legs (5) and the surface elements (3, 4) and in which the layers (6) covering the surface elements (3, 4) are a square. The shape of the layer (6) elements can be different from a rectangle or a square, and the tape (20, 30) crossing defining the surfaces (3, 4) can be different than the diagonals of the surface elements (3, 4). Notwithstanding the aforementioned, the configuration shown in FIG. 7 allows a better compaction compared with other embodiments because the vertices of the layer (6) elements don't interfere with each other, enabling the maximum possible condensation, minimizing the gaps between the layer (6) elements at the impact zone, as it can be seen in FIGS. 7A and 7B that show the structure before and after condensation.

One embodiment of the manufacturing process of the invention comprises the following steps that are depicted in FIGS. 8A, 8B and 9A to 9D:
  providing a first tape of material (20, 30),
    folding the first tape of material (20, 30) following a bidimensional auxetic pattern of adjacent auxetic cells (1) having a surface element (23, 33) and two legs (25, 35) extending from the surface element (23, 33),
  providing a second tape of material (21, 31),
  joining the second tape of material (21, 31) to one of the surface elements (23, 33) of the bidimensional auxetic pattern of the first tape (20, 30) forming an angle with the longitudinal direction of the first tape (20, 30),
  folding the second tape of material (21, 31) following a bidimensional auxetic pattern of adjacent cells (1) having a surface element (23, 33) and two legs (25, 35) extending from the surface elements (23, 33), the first tape (20, 30) and the second tape (21, 31) of material being configured such that the projection or sections cut of the structure in at least two planes perpendicular to the surface elements (23, 33) follows a bidimensional auxetic pattern,
  providing additional tapes of material (21, 31) and joining them to every surface element (23, 33) of the bidimensional auxetic pattern of the first tape of material (20, 30) and repeating the previous step.

In order to maintain the final shape and total thickness of the resulting tridimensional cell structure, there is proposed an intermediate curing process of the folded tapes (20, 30, 21, 31) that are pre-impregnated with resin or to use infusion or injection resin process, in an additional step, if they are not pre-impregnated, so that each folded tape (20, 30, 21, 31) maintains the required shape prior to the step of joining the tapes (20, 30, 21, 31) together.

Alternatively, the tapes (20, 30, 21, 31) can be assembled together first without curing them so that they can still deform as a mechanism and then obtaining the final shape and total thickness by an external tool holding the external top and bottom surfaces of the resulting tridimensional cell structure, separating them a required distance and then curing the ensemble, if the tapes (20, 30, 21, 31) are pre-impregnated or with additional intermediate steps of using an infusion or injection resin process, if they are not pre-impregnated.

As previously stated, the claimed structured can be covered by two panels (10) as shown in FIG. 1B, forming a sandwich to increase its bending stiffness for structural applications or to increase impact resistance provided by the additional panels (10) and the deformable structure core.

In the particular case where the tridimensional cell structure forms the inner core of a sandwich panel comprising two additional top and bottom parallel external layers (10) covering the inner core, these external layers (10) can be bound in a final step to the cured core. Alternatively, when the inner core tridimensional cell structure is not yet cured, the two additional top and bottom parallel external layers (10) can be used directly to adhere the top and bottom layers (6) of the core inner structure by means of adhesive or resin. By separating the two parallel external layers (10) the required distance, the final shape and total thickness can be obtained by an additional step of curing or co-curing the resulting ensemble. The separation of the two parallel external layers (10) can be performed, for example, by adding separating elements with a required separation height, between the two parallel external layers (10) on the contour boundary of the sandwich panels.

Figure 8A:
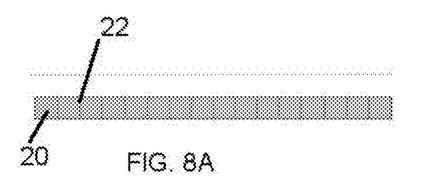
FIGS. 8A and 8B show a schematic diagram of an embodiment of the manufacturing steps of the structure object of the invention from a tape of material.
Figure 8B:
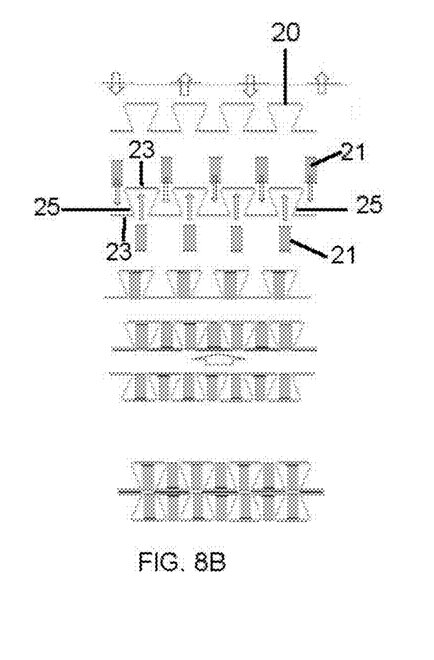

In the previous embodiments, the tape (20, 30, 21, 31) can be folded by folding lines orthogonal with respect to the tape (20, 30) length dimension as showed in FIG. 8A forming open cells (1) and assembled with the ceramic layer (6) material forming kinked strips, as shown in FIG. 8B, that are assembled together in two directions to form the deformable structure as shown in FIG. 8C comprising closed cells (2).

Figures 9A, 9B, 9C:
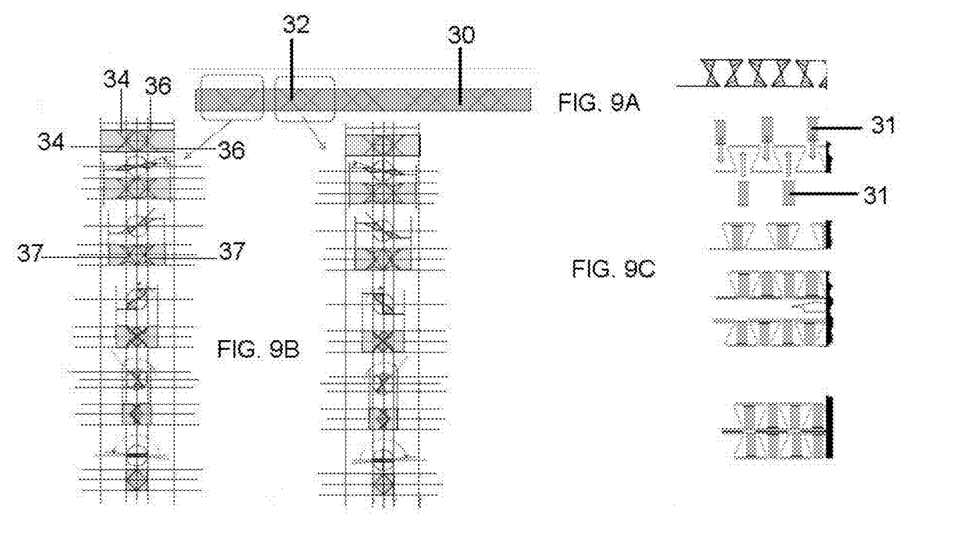
FIGS. 9A to 9D show a schematic diagram of another embodiment of the manufacturing steps of the structure object of the invention from a tape of material having a different folding arrangement.
Figure 9D:
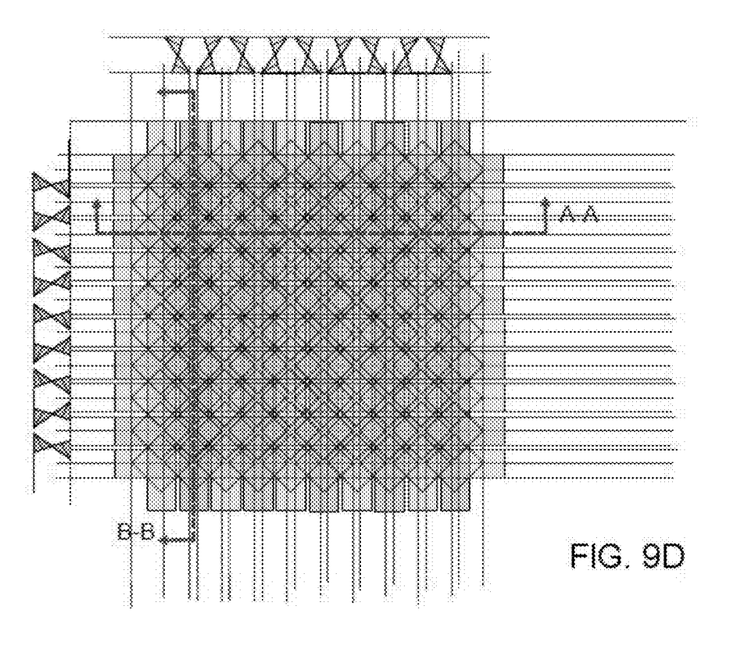

Alternatively, the tapes (20, 30, 21, 31) can be folded with an origami shape as represented in FIGS. 9A-9D by starting with a flat tape (30) that is folded in diagonal folding lines with respect to the tape (30) length dimension as shown in FIG. 9A. The tape (30) then folded by the lines with the steps shown in FIG. 9B to form a kinked origami strip to which a ceramic hard layer (6) material can be added. The tapes (30, 31) are assembled together in two directions to form the deformable structure as shown in FIG. 9C. This alternative manufacturing process provides the advantage that the tapes (30, 31) can adapt better to the vertex of the rectangular or square layer (6) elements allowing a better compaction and deployment of the structure, always maintaining the continuity of the tape section. FIG. 9D shows a top view and sectional views of the resulting structure that can be added together to form the required final thickness of the structure.

FIG. 9B shows an embodiment of the origami manufacturing process in which the folding lines (32) are diagonally located with respect to the longitudinal direction of the tape (30). FIG. 8D shows the folding process in which the folding lines (22) are located orthogonal with respect to the longitudinal direction of the tape (20).

In FIG. 8D, every leg (5) and the surface element (3) are squares, with the folding lines (22) orthogonal to the longitudinal direction of the tape (20).

In FIG. 9B every leg (5) and the surface element (3) are each a rhombus. The folding lines (32) therefore form four different triangles (34, 36), that are folded in pairs, one of the pairs of triangles (34) being folded towards a direction of the tape (30) and the other pair of triangles (36) being folded towards the opposite direction of the tape (30). The vertex of the triangles (34, 36) and the rhombus (37) are coincident as the two folding lines (32) cross each other.

Figure 10:
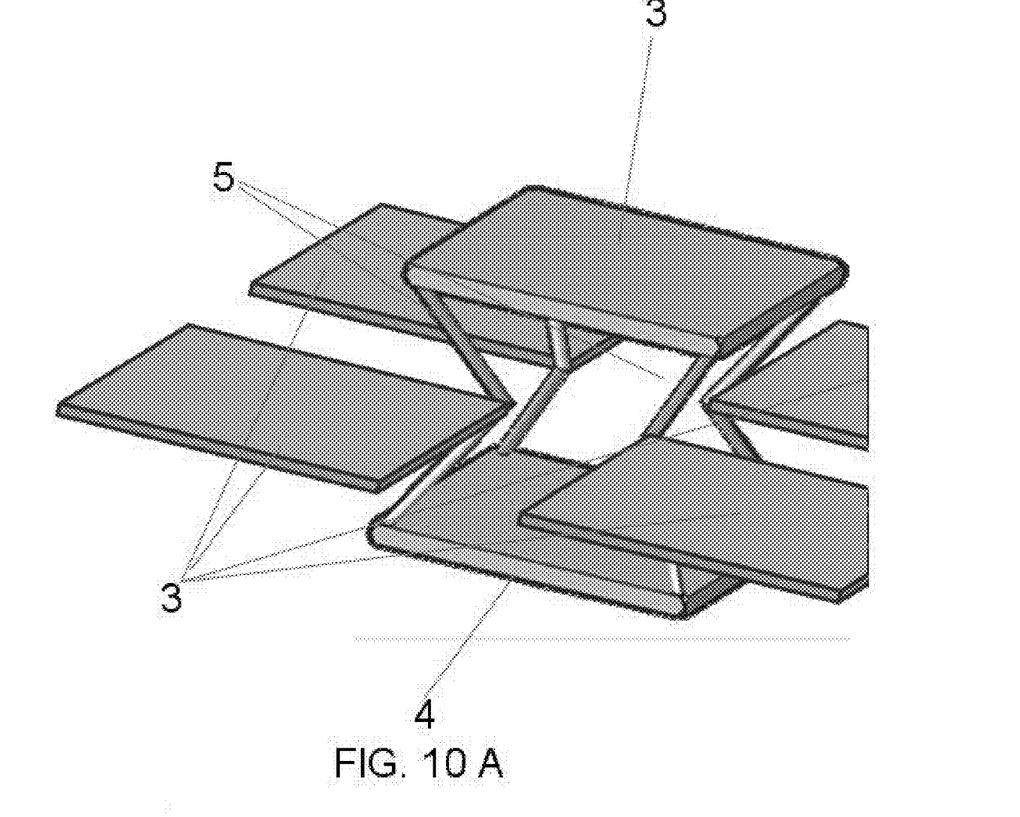
FIGS. 10A to 10B show a tridimensional view of other embodiments of a cell structure.

In FIG. 10A there is shown an embodiment of the re-entrant hexagon tridimensional cell where the legs (5) are bars or rods and are joined directly to the surface elements (3, 4).

Figure 10B:
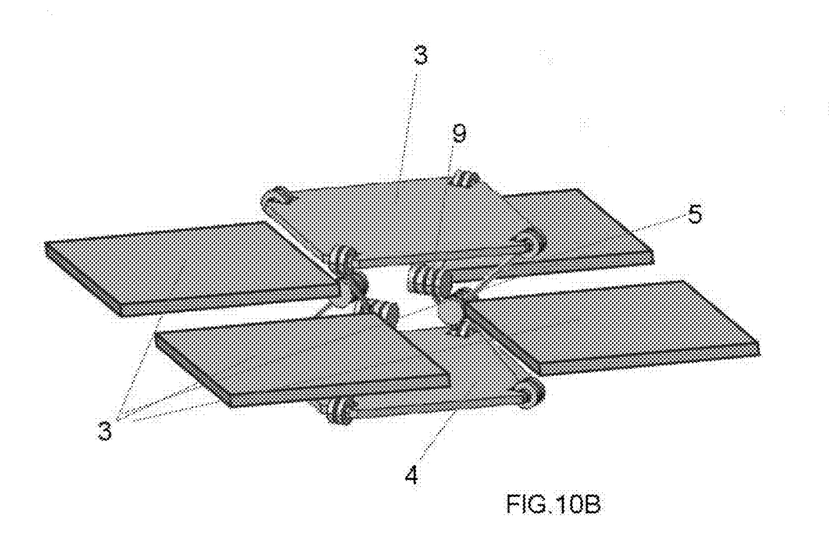

As another alternative, in FIG. 10B, there is shown an embodiment of the re-entrant hexagon tridimensional cell (1) where the legs (5) are bars or rods directly joined to the surface elements (3, 4) with a physical hinge (9).

The legs (5) of the previous embodiments with bars and rods have a circular cross-section in the figures, although other configurations are possible.

On the presented embodiments, the cavities formed by the cells (1) are empty, i.e., filled with air, but alternatively they can be filled by deformable and lightweight material as foam, with the advantage of avoiding water ingestion of the cells (1) that can increase the weight of the structure and also helping to maintain the shape when manufacturing.

Figure 11:
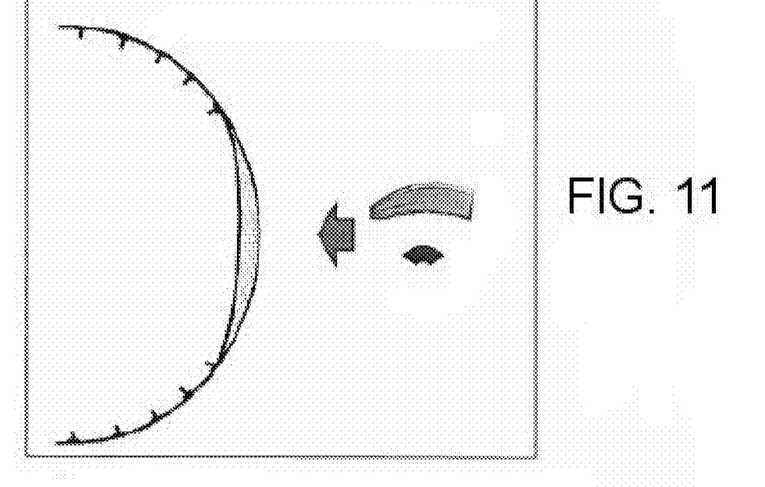
FIG. 11 shows an embodiment of a sandwich airframe integrated shield.
Figure 12:
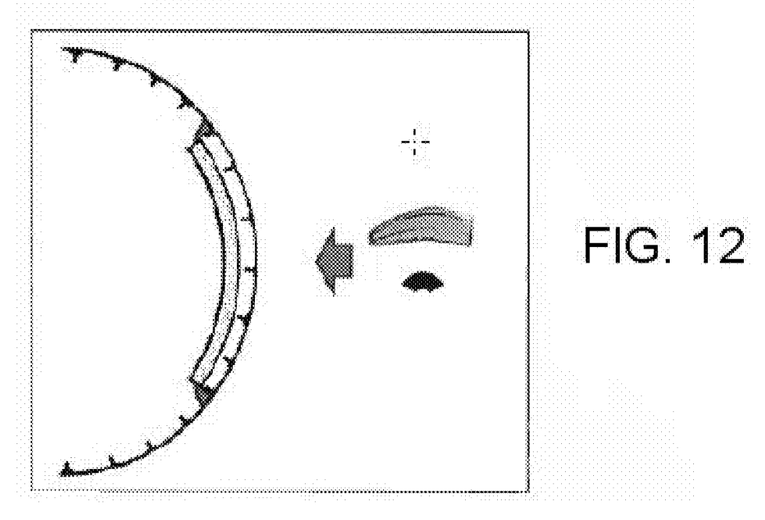
FIG. 12 shows an embodiment of an airframe added shield.

FIGS. 11 and 12 disclose a shield that could be used also as a structural part integrated in the aircraft airframe (FIG. 11), or as an added shield (FIG. 12) as a separate functional part, if assembled in a later assembly process. If integrated as a structural part, the airframe could also take advantage of such sandwich configurations as a lightweight structure for the skin panel's stabilization, similar to conventional primary aircraft loads carrying honeycomb sandwich structures, but with the added functionability value of resisting high energy impacts. If assembled as an added shield, its functionability would be only to resist the potential high energy engine debris impacts, in addition to withstanding also the structural loads of the aircraft. In this last embodiment, as an added shield, the tridimensional cell structure can be covered with two additional panels as a sandwich or directly without them, in order to reduce the penalty weight if additional bending stiffness is not required.

Figure 13:
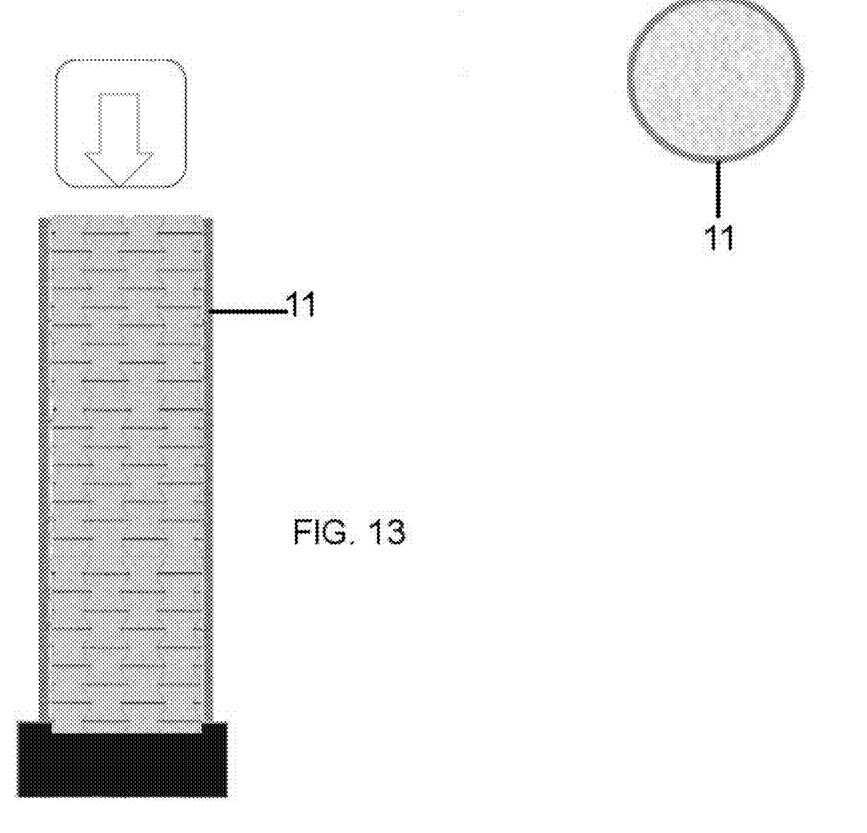
FIG. 13 shows an embodiment of a shock absorber.

Finally, FIG. 13 discloses an additional application of the claimed structure as a shock absorber shaped as a column configuration that can be used to attach to the load part of an airframe structure, or the front part of a car, for absorbing energy at an aircraft crash landing situation or at a car frontal accident situation. In FIG. 13, the deformable structure is covered by an external layer (11) to increase the absorbing energy capabilities but it can also not be added, in order to simplify and reduce manufacturing costs.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A deformable auxetic structure for absorbing energy of an impact comprising:
a plurality of interconnected adjoining tridimensional auxetic cells, each tridimensional auxetic cell comprising:
at least one surface element having a plurality of intersecting sides, and
a plurality of legs extending from the at least one surface element,
the plurality of legs and the at least one surface element being configured such that a section cut of the deformable auxetic structure, in two planes perpendicular to said at least one surface element, follows an auxetic pattern, wherein respective lengths of intersections between the two planes and said at least one surface element are greater than lengths of all of the plurality of intersecting sides of said at least one surface element.

2. The deformable auxetic structure, according to claim 1, wherein the at least one surface element of each tridimensional auxetic cell comprises a first surface element and a second surface element having an offset with the first surface element, the plurality of legs extending between both surface elements.

3. The deformable auxetic structure, according to claim 2, wherein the first and the second surface elements of each auxetic cell have a planar polygon shape.

4. The deformable auxetic structure, according to claim 3, wherein the legs extend from at least every vertex of the polygon shape of the first surface element to a vertex of the polygon shape of the second surface element.

5. The deformable auxetic structure, according to claim 1, wherein the legs are joined to the surface element by means of a hinge.

6. The deformable auxetic structure, according to claim 1, wherein the at least one surface element and the plurality of legs are formed by a tape that continuously extends forming the plurality of legs and a cruciform shape in the surface element.

7. The deformable auxetic structure, according to claim 1, wherein the auxetic cells comprise a layer of material located covering the surface element.

8. The deformable auxetic structure, according to claim 7, wherein the layer is a polygon of four sides.

9. The deformable auxetic structure, according to claim 7, wherein the layer is a polygon of eight sides.

10. A sandwich panel comprising:
an inner core according to the deformable auxetic structure of claim 1, and
two external panels having said inner core in-between.

11. A shock absorber comprising:
an inner core according to the deformable auxetic structure of claim 1, and
an external layer surrounding the inner core.

12. A manufacturing process of the deformable auxetic structure of claim 1 that comprises an auxetic structure formed by a plurality of interconnected adjoining tridimensional auxetic cells, comprising the following steps:
providing a first tape of material, folding the first tape of material following a bidimensional auxetic pattern of adjacent cells having a surface element and two legs extending from the surface element,
providing a second tape of material,
joining said second tape of material to one of the surface elements of the bidimensional auxetic pattern of the first tape forming an angle with a longitudinal direction of the first tape,
folding the second tape of material following a bidimensional auxetic pattern of adjacent cells having a surface element and two legs extending from the surface element, the first tape and the second tape of material being configured such that a section cut of the structure in at least two planes perpendiculars to the surface element follows a bidimensional auxetic pattern,
providing additional tapes of material and joining them to every surface element of the bidimensional auxetic pattern of the first tape of material and repeating the previous step.

13. The manufacturing process of a deformable auxetic structure, according to claim 12, wherein the first and second tapes of material comprise folding lines that are orthogonal to the longitudinal direction of the tapes or that are diagonal to the longitudinal direction of the tapes and the tapes are folded following said folding lines.

14. The manufacturing process of a deformable auxetic structure, according to claim 13, further comprising the step of curing the folded tapes before the step of being joined.

15. The manufacturing process of a deformable auxetic structure, according to claim 13, further comprising the step of curing the structure after the tapes are folded and joined to form the structure.

\* \* \* \* \*